(12) United States Patent
Azima et al.

(10) Patent No.: US 6,192,136 B1
(45) Date of Patent: Feb. 20, 2001

(54) INERTIAL VIBRATION TRANSDUCERS (75) Inventors: Henry Azima, Cambridge; Martin Colloms, London; Neil John Harris, Cambridge, all of (GB)

(73) Assignee: New Transducers Limited, London (GB)

(*) Notice: Under 35 U.S.C. 154(b), the term of this patent shall be extended for 0 days.

(21) Appl. No.: 09/011,773

(22) PCT Filed: Sep. 2, 1996

(86) PCT No.: PCT/GB96/02167

§ 371 Date: May 13, 1998

§ 102(e) Date: May 13, 1998

(87) PCT Pub. No.: WO97/09859

PCT Pub. Date: Mar. 13, 1997

Related U.S. Application Data (63) Continuation-in-part of application No. 08/707,012, filed on Sep. 3, 1996.

(30) Foreign Application Priority Data

Sep. 2, 1995 (GB) .................................................... 9517918
Oct. 31, 1995 (GB) .................................................... 9522281
Mar. 30, 1996 (GB) .................................................... 9606836

(51) Int. Cl.[7] ...................................................... H04R 25/00
(52) U.S. Cl. ........................ 381/338; 381/396; 381/413; 381/417; 381/424
(58) Field of Search .................................. 381/151, 152, 381/396, 412, 413, 417, 425, 431, 421, FOR 152, FOR 163, 338, 182, 186, 353, 354; 181/146, 151, 199

(56) References Cited

U.S. PATENT DOCUMENTS 3,111,187   11/1963  Barlow .
3,651,283 * 3/1972  Doschek ............................... 381/417
4,506,117 * 3/1985  Fresard ................................. 381/396

FOREIGN PATENT DOCUMENTS 2 023 375   12/1979  (GB) .

* cited by examiner

Primary Examiner—Huyen Le
(74) Attorney, Agent, or Firm—Foley & Lardner (57) ABSTRACT

An inertial vibration transducer (9) characterised by a motor coil assembly comprising a tubular member (18) and a coil (13) rigidly fixed to the tubular member, and by a magnet assembly (15) disposed concentrically within the motor coil, and resilient means (19) supporting the magnet assembly for axial movement relative to the motor coil, the motor coil and tubular member being adapted to be rigidly mounted to a distributed mode radiator (2).

20 Claims, 6 Drawing Sheets

INERTIAL VIBRATION TRANSDUCERS

This application is a continuation-in-part of application Ser. No. 08/707,012, filed Sep. 3, 1996.

TECHNICAL FIELD

The invention relates to transducers and more particularly to vibration transducers for loudspeakers comprising panel-form acoustic radiating elements.

BACKGROUND ART

It is known from GB-A-2262861 to suggest a panel-form loudspeaker comprising:

- a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;
- a mounting means which supports the panel or attaches to it a supporting body, in a free undamped manner;
- and a electro-mechanical drive means coupled to the panel which serves to excite a multi-modal resonance in the radiator panel in response to an electrical input within a working frequency band for the loudspeaker.

U.S. Pat. No. 4,506,117 of MULTIPHONIE discloses an electroacoustic transducer comprising an inertial mass adapted to be attached rigidly by its base plate to a panel to be vibrated.

DISCLOSURE OF INVENTION

Embodiments of the present invention use members of nature, structure and configuration achievable generally and/or specifically by implementing teachings of our co-pending parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending parent application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers.

Members as above are herein called distributed mode radiators and are intended to be characterised as in the above copending parent application and/or otherwise as specifically provided herein.

The invention is an inertial vibration transducer for exciting a member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted on said member at one of said locations or sites to vibrate the member to cause it to resonate forming an acoustic radiator which provides an acoustic output when resonating, comprising a motor coil assembly having a coil rigidly fixed to a tubular member, a magnet assembly disposed concentrically with respect to the motor coil assembly, and a resilient suspension supporting the magnet assembly for axial movement relative to the motor coil assembly, and wherein the tubular member is adapted to be rigidly mounted directly to the member to be vibrated by adhesive means. The resilient suspension may comprise mutually opposed elastomeric members disposed on opposite sides of the magnet assembly. Caps may be provided for closing the axial ends of the tubular member, and the resilient suspension may be mounted on the caps. The caps may comprise the resilient suspension. Each cap may comprise an annular compliant roll surround. Magnetic shields may be provided over the caps. The coil may be mounted on the inner face of the tubular member. The motor assembly may be adapted for reception in a correspondingly shaped cavity in the radiator. The motor coil assembly may be adapted to be rigidly fixed to a face of the radiator. The magnet assembly may comprise opposed generally disc-like pole pieces, The periphery of one of which is disposed within and adjacent to the motor coil assembly, and the periphery of the other of which pole pieces is formed with a flange arranged to lie adjacent to and to surround the motor coil assembly. A resilient member may be sandwiched between one of the pole pieces and a face of the radiator. The magnet assembly may comprise an opposed pair of magnets sandwiching a pole piece. Complementary magnet assemblies and motor coil assemblies may be arranged on opposite faces of the radiator, and a fastener may be provided tying the magnet assemblies together for push-pull operation.

From another aspect the invention is a loudspeaker comprising an inertial transducer as described above.

BRIEF DESCRIPTION OF DRAWINGS

The invention is disgrammatically illustrated, by way of example, in the accompanying drawings, in which.

BEST MODE FOR CARRYING OUT THE INVENTION

Figure 1:
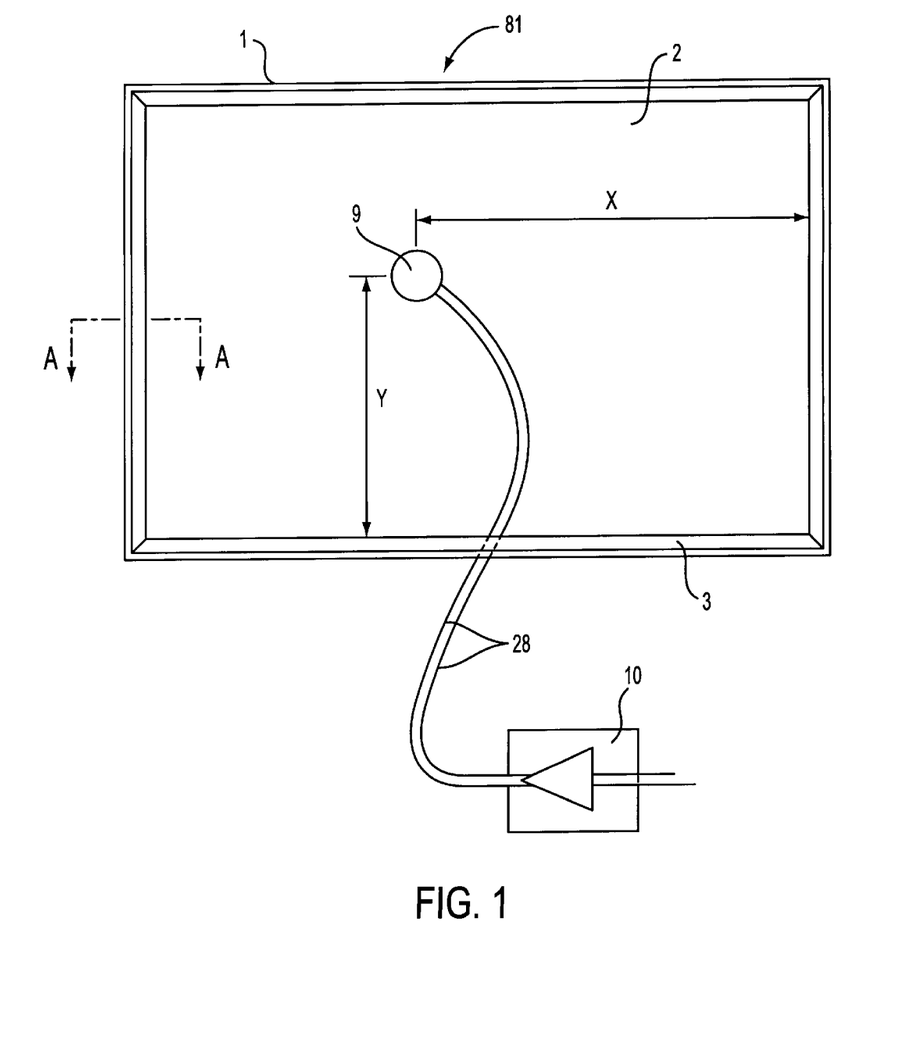
FIG. 1 is a diagram showing a distributed-mode loudspeaker as described and claimed in our co-pending parent application Ser. No. 08/707,012.

Referring to FIG. 1 of the drawings, there is shown a panel-form loudspeaker (81) of the kind described and claimed in our co-pending parent application Ser. No. 08/707,012 comprising a rectangular frame (1) carrying a resilient suspension (3) round its inner periphery which supports a distributed mode sound radiating panel (2). A transducer (9) e.g as described in detail with reference to our co-pending application Ser. Nos. 09/011,773, 09/011,770, and 09/011,831, is mounted wholly and exclusively on or in the panel (2) at a predetermined location defined by dimensions x and y, the position of which location is calculated as described in our co-pending parent application Ser. No. 08/707,012 to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
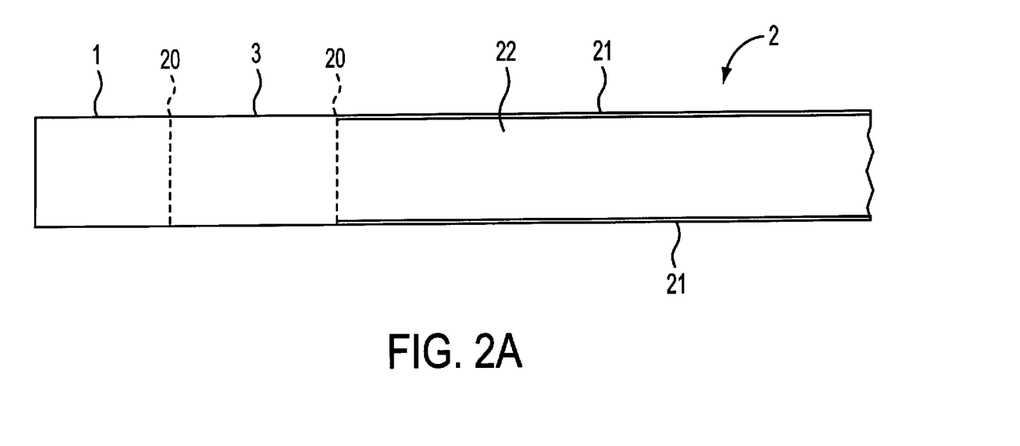
FIG. 2a is a partial section on the line A—A of FIG. 1.
Figure 2B:
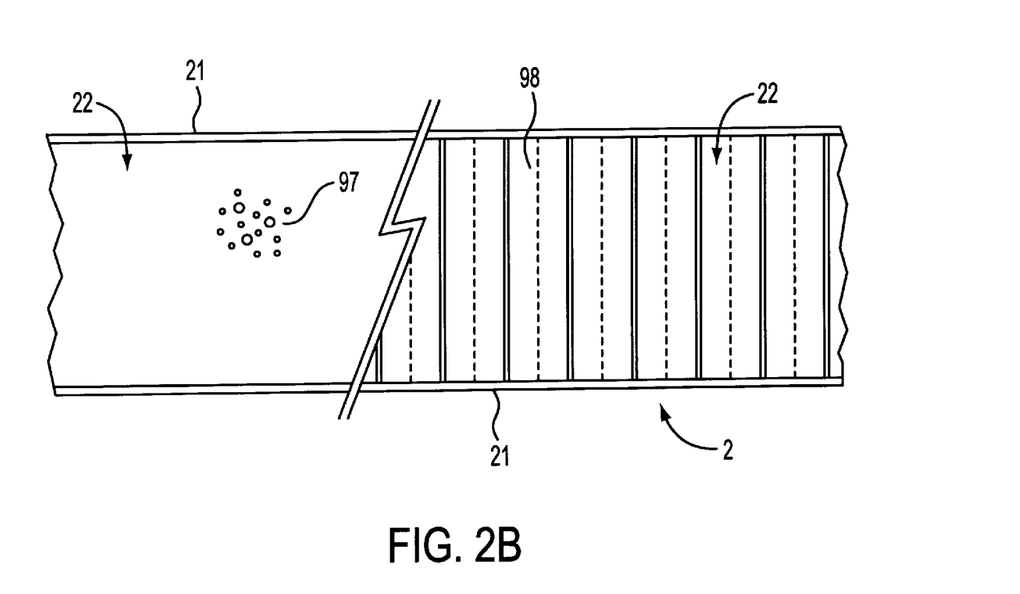
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminum alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibers e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastic shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminum alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate distributed mode acoustic radiator panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bidirectional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left-right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
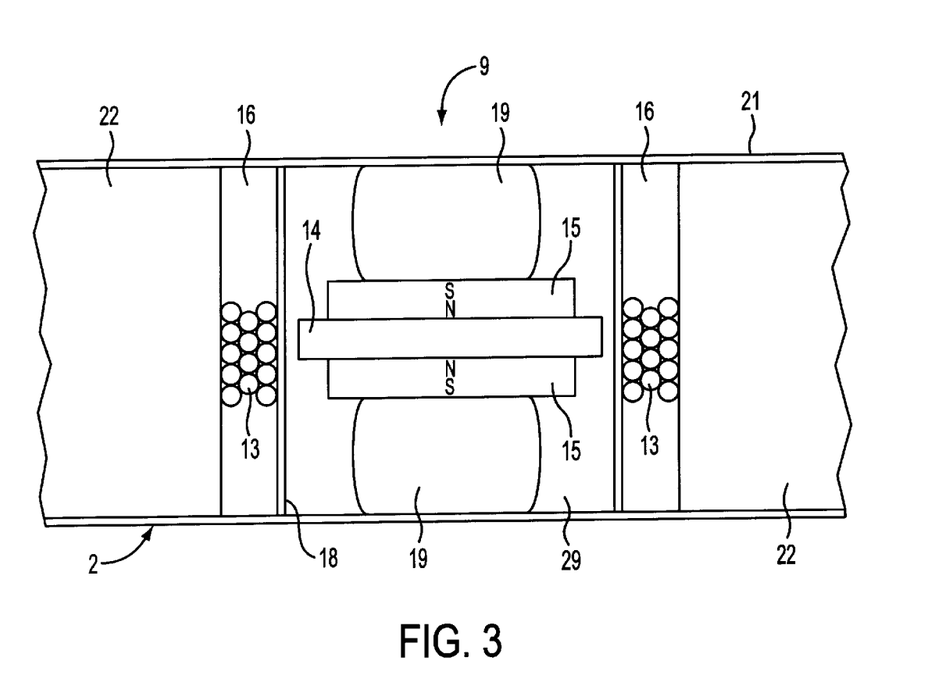
FIG. 3 is a sectional side view of a first embodiment of transducer.

FIG. 3 illustrates an embodiment of moving coil transducer (9) arranged to be embedded entirely within the interior of a stiff lightweight distributed mode panel (2) of the kind comprising a core (22) faced on both sides with skins (21) to launch bending waves into the panel.

The transducer comprises a coil (13) embedded in a fixing (16), e.g. of epoxy resin, in a cavity (29) in the core (22) of the panel (2), and surrounding a cylindrical coil former (18), the coil (13) and former (18) thus being rigidly fixed in the panel (2).

Mounted in the portion of the cavity (29) defined by the coil former (18) is a magnet assembly comprising an opposed pair of magnets (15) separated by a pole-forming member (14), the magnet assembly being mounted on the inner faces of skins (21) of the panel (2) by means of opposed compliant suspension members (19) of rubber-like material, e.g. foam rubber, which are adhesively bonded to the magnet assembly and to the interior surfaces of the respective skins (21) of the panel. The magnet assembly (14,15) is thus mounted concentrically of the coil (13) and is axially movable on its suspension (19).

The transducer (9) operates to launch bending waves into the panel (2) by vibrating to cause local resilient deformation of the panel due to relative axial motion between the magnet assembly and the coil. The drive effect is enhanced by increasing the mass of the magnet assembly.

In operation, at least at high frequencies, since the mass of the magnet assembly is relatively large in comparison to that of the panel, the inertia of the magnet assembly will tend to hold the magnet assembly stationary and to vibrate the panel relatively thereto.

Figure 4:
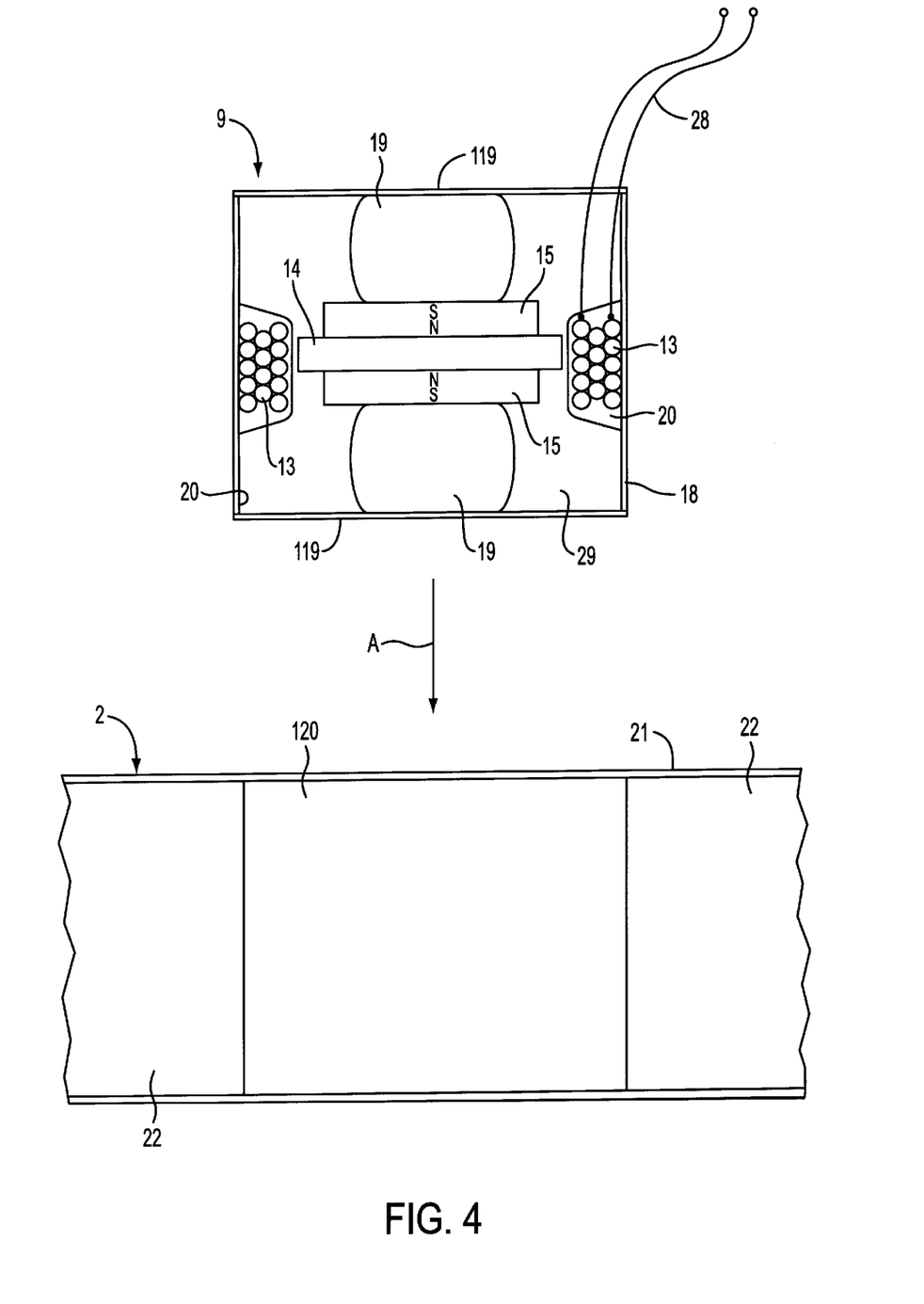
FIG. 4 is a sectional side view of a second embodiment of transducer.

FIG. 4 illustrates an embodiment of moving coil transducer (9) similar to that shown in FIG. 3 and arranged to be embedded entirely within the interior of a stiff lightweight distributed mode radiator panel (2) of the kind comprising a core (22) faced with skins (21) to launch bending waves into the panel. The transducer (9) is formed as a modular assembly to facilitate its assembly into a panel (2). As shown, the panel (2) is formed with a suitable cavity (120) to receive the transducer (9).

The transducer comprises a coil (13) fixed to the interior wall of a cylindrical coil former (18) e.g. by means of a rigid adhesive potting (20), the former (18) providing the outer casing of the transducer and being closed at its opposite axial ends by lightweight end caps (119) which are rigidly fixed to the coil former in any desired fashion, e.g. by means of adhesive bonds (220). The assembly is arranged to be located in the transducer cavity (120) in a distributed mode panel (2), by movement in direction of arrow 'A' as indicated. The transducer is fixed in the cavity by means of an adhesive.

Mounted in the cavity (29) defined by the coil former (18) is a magnet assembly comprising an opposed pair of magnets (15) separated by a pole-forming member (14), the magnet assembly being mounted on the end caps (119) of the coil former (18) by means of opposed compliant suspension members (19) of rubber-like material, e.g. foam rubber, which are adhesively bonded to the magnet assembly and to the interior surfaces of the respective end caps.

The magnet assembly (14, 15) is thus mounted concentrically of the coil (13) and is axially movable on its suspension (19). The transducer (9) operates to launch bending waves into the panel (2) by vibrating to cause local resilient deformation of the panel in the same way as described above with reference to the embodiment of FIG. 3.

Figure 5A:
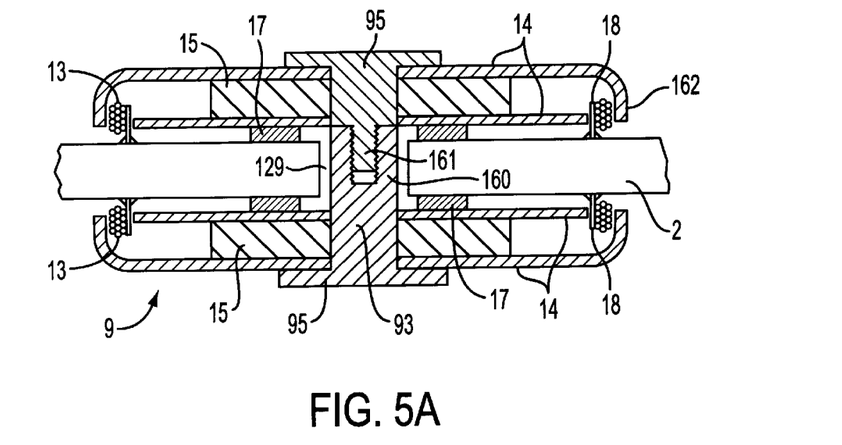
FIG. 5a is a sectional side view of a third embodiment of transducer.

The transducer arrangement (9) of FIG. 5a comprises complementary push/pull drivers disposed on opposite sides of the panel (2) to launch bending waves into a rigid lightweight distributed mode radiator (2) of the kind comprising a core (22) enclosed by opposed skins (21), to cause the panel to resonate.

In this embodiment, coils (13) are rigidly fixed, e.g. by means of an adhesive, on the outside of a coil former (18) to form a motor coil assembly which is rigidly bonded to the opposed surface skin (21) of the radiator panel (2), e.g. by means of an epoxy adhesive bond (16). Magnets (15) are enclosed by pairs of poles (14), one of which is disc-like and is disposed with its periphery close to the interior of each coil former (18), and the other of which has a peripheral flange (162) arranged to surround the coil (13).

A fixing member (headed fastener) (93) which is generally cylindrical in shape is arranged to pass freely through an aperture (29) in the panel (2). The fixing member (93) comprises opposed generally complementary parts each formed with a head (95) which are clamped against the axial extremities of the respective pair of transducers (9) to couple the drivers together. The complementary parts of the fixing member (93) are secured together by complementary screw-threaded portions (160, 161). The fixing member may be of any suitable material e.g. plastics or metal.

The transducer arrangement (9) of FIG. 5a is not rigidly clamped to the panel (2) adjacent to the aperture (29) but is instead coupled to the panel via resilient pads (17) e.g. of foam rubber positioned close to the panel aperture (29) in much the same manner as is shown with reference to FIGS. 3 and 4 whereby the transducer works to launch bending waves into the panel by inertial effects due to the combined mass of the respective drivers.

Figure 5B:
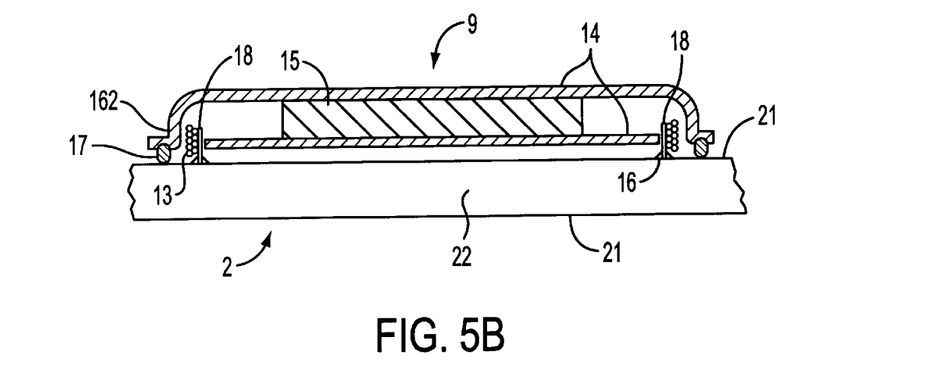
FIG. 5b is a sectional side view of a fourth embodiment of transducer.

The transducer (9) of FIG. 5a is generally similar to that of FIG. 5a but is intended for attachment to only one side of a panel (2). Thus the magnet assembly (14, 15) is secured to the surface of the panel (2) by means of a resilient suspension (17) e.g. of rubber, which is attached to the periphery of the flange (162) of the outer pole pieces (14).

Figure 5C:
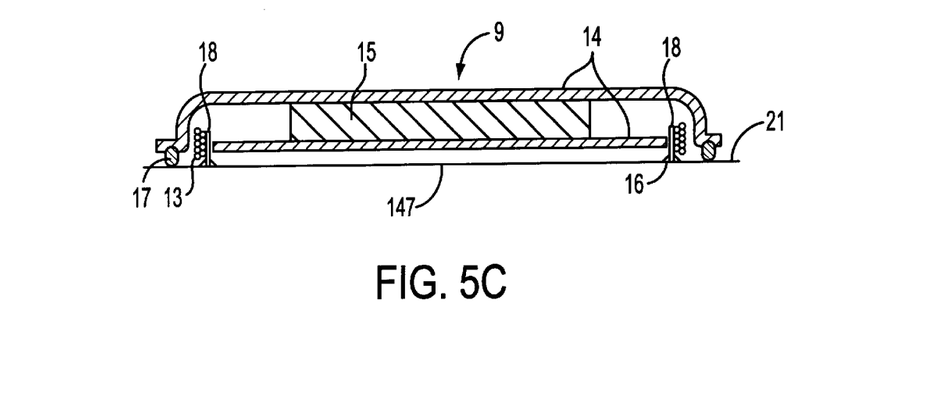
FIG. 5c is a sectional side view of a fifth embodiment of transducer.

FIG. 5c shows a transducer (9) of the kind shown in FIG. 5b and intended for easy application to a panel surface. Thus the transducer (9) is mounted, by way of the former (18) and resilient suspension (17) on a thin substrate (147) formed with a self adhesive outer layer whereby the transducer can be mounted in position.

Figure 6:
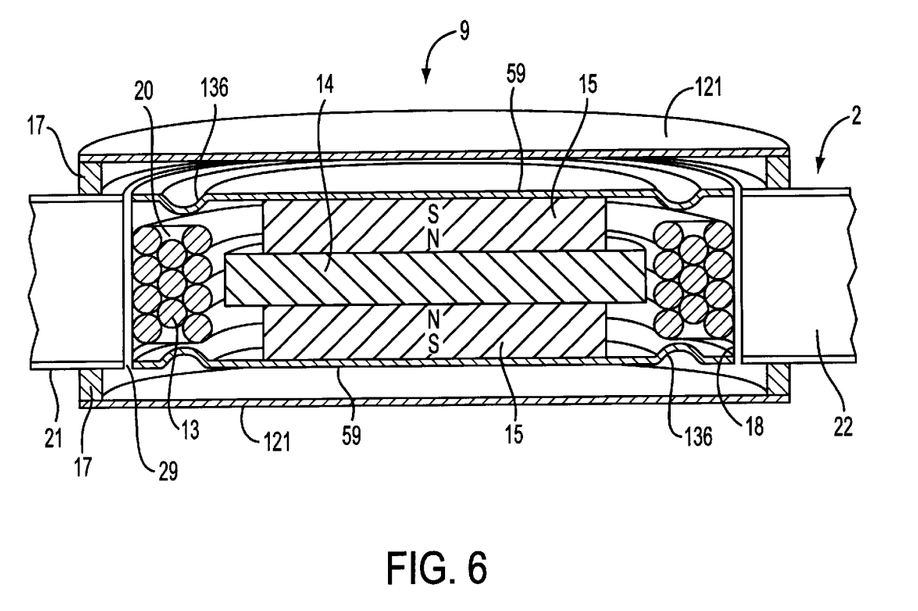
FIG. 6 is a sectional side view of a sixth embodiment of transducer.

The transducer (9) of FIG. 6 is intended as a low profile device which can be buried substantially within the thickness of a distributed mode panel (2). The transducer comprises a cylindrical coil former (18) adapted to be fixed, e.g. by means of an adhesive, in a corresponding aperture (29) in the panel (2). A coil (13) is secured to the interior face of the former (18) e.g. with the aid of an adhesive to form a motor coil assembly. The opposed axial ends of the former (18) are closed by disc-like compliant suspension members (59), e.g. of rubber or the like, each of which is formed with an annular corrugation (136) near to its periphery to form a roll surround similar to that used on conventional pistonic cone loudspeaker drive units. The peripheries of the members (59) are secured to the axial ends of the coil former (18) e.g. by clamping, with the aid of an adhesive or in any other suitable fashion. The centre portions of the members (59), which centre portions are defined by the annular corrugations (136) carry between them a magnet assembly comprising an opposed pair of magnets (15) sandwiching a pole piece (14). The outer face of the magnets (15) are bonded or otherwise secured to the centre portions of the members (59), whereby the magnet assembly (14, 15) is located concentrically with respect to the coil (13) and is capable of limited axial movement relative thereto.

The magnet assembly is shielded by means of disc-like screens (121) mounted on annular resilient members (17) supported on the panel (2) to prevent or limit the stray magnet field surrounding the panel adjacent to the transducer.

Although in the above described embodiments of transducer, the motor coil assemblies have been shown to be fixed to the panel (2) and the magnet assemblies have been shown to be compliantly mounted with respect to the panel, it will be understood that this arrangement could be reversed so that the magnet assemblies are fixed to the panel and the motor coil assemblies are compliantly suspended. In such a case the magnet assemblies will be made relatively light and the motor coil assemblies will be made relatively heavy to increase the drive effect.

What is claimed is:

1. An inertial vibration transducer for exciting a member having capability to sustain and propagate input vibrational energy by bending waves in at least one operative area extending transversely of thickness, the transducer comprising a motor coil assembly having a coil rigidly fixed to a tubular member which is adapted to be rigidly mounted directly to the member to be vibrated, a magnet assembly disposed concentrically with respect to the motor coil assembly, and a resilient suspension supporting the magnet assembly for axial movement relative to the motor coil assembly, wherein the resilient suspension comprises mutually opposed elastomeric members disposed on opposite sides of the magnet assembly.

2. An inertial vibration transducer for exciting a member having capability to sustain and propagate input vibrational energy by bending waves in at least one operative area extending transversely of thickness, the transducer comprising a motor coil assembly having a coil rigidly fixed to a tubular member which is adapted to be rigidly mounted directly to the member to be vibrated, a magnet assembly disposed concentrically with respect to the motor coil assembly, and a resilient suspension supporting the magnet assembly for axial movement relative to the motor coil assembly, wherein the motor coil assembly is adapted for reception in a corresponding shaped cavity in the member.

3. An inertial vibration transducer according to claim 2, wherein the coil (13) is mounted on the inner face of the tubular member (18).

4. An inertial vibration transducer according to claim 2, wherein the magnet assembly (15) comprises an opposed pair of magnets (15) sandwiching a pole piece (14).

5. An inertial vibration transducer for exciting a member having capability to sustain and propagate input vibrational energy by bending waves in at least one operative area extending transversely of thickness, the transducer comprising a motor coil assembly having a coil rigidly fixed to a tubular member which is adapted to be rigidly mounted directly to the member to be vibrated, a magnet assembly disposed concentrically with respect to the motor coil assembly, a resilient suspension supporting the magnet assembly for axial movement relative to the motor coil assembly, and caps closing the axial ends of the tubular member, wherein the caps comprise the resilient suspension.

6. An inertial vibration transducer according to claim 5, wherein each cap (59) comprises an annular compliant roll surround (136).

7. An inertial vibration transducer according to claim 6, further comprising magnetic shields (121) over the caps (59).

8. An inertial vibration transducer for exciting a member having capability to sustain and propagate input vibrational energy by bending waves in at least one operative area extending transversely of thickness, the transducer comprising complementary magnet assemblies and motor coil assemblies adapted for mounting on opposite faces of the member and a fastener tying the magnet assemblies together for push-pull operation, wherein each motor coil assembly has a coil rigidly fixed to a tubular member which is adapted to be rigidly mounted directly to the member to be vibrated, each magnet assembly is disposed concentrically with respect to its respective motor coil assembly, and a resilient suspension supports the magnet assemblies for axial movement relative to the motor coil assemblies.

9. An inertial vibration transducer according to claim 8, wherein the magnet assembly (15) comprises opposed generally disc-like pole pieces (14), the periphery of one of which is disposed within and adjacent to the motor coil assembly (13, 18), the periphery of the other of which pole pieces is formed with a flange (162) arranged to lie adjacent to and to surround the motor coil assembly.

10. An inertial vibration transducer according to claim 9, wherein the resilient suspension comprises a resilient member (17) which is sandwiched between one of the pole pieces and a face of the radiator.

11. A loudspeaker comprising:
a member having capability to sustain and propagate input vibrational energy by bending waves in at least one operative area extending transversely of thickness, and
an inertial transducer mounted on said member to vibrate the member forming an acoustic radiator which provides an acoustic output, the transducer comprising:
a motor coil assembly having a coil rigidly fixed to a tubular member which is rigidly mounted directly to the member to be vibrated, a magnet assembly disposed concentrically with respect to the motor coil assembly, and a resilient suspension supporting the magnet assembly for axial movement relative to the motor coil assembly, wherein the resilient suspension comprises mutually opposed elastomeric members disposed on opposite sides of the magnet assembly.

12. A loudspeaker comprising:

a member having capability to sustain and propagate input vibrational energy by bending waves in at least one operative area extending transversely of thickness, and an inertial transducer mounted on said member to vibrate the member forming an acoustic radiator which provides an acoustic output, the transducer comprising:

a motor coil assembly having a coil rigidly fixed to a tubular member which is rigidly mounted directly to the member to be vibrated, a magnet assembly disposed concentrically with respect to the motor coil assembly, and a resilient suspension supporting the magnet assembly for axial movement relative to the motor coil assembly, wherein the motor coil assembly is received in a correspondingly shaped cavity in the radiator.

13. A loudspeaker according to claim 12, wherein the coil is mounted on the inner face of the tubular member.

14. A loudspeaker according to claim 12, wherein the magnet assembly comprises an opposed pair of magnets sandwiching a pole piece.

15. A loudspeaker comprising:

a member having capacity to sustain and propagate input vibrational energy by bending waves in at least one operative area extending transversely of thickness, and an inertial transducer mounted on said member to vibrate the member forming an acoustic radiator which provides an acoustic output, the transducer comprising:

a motor coil assembly having a coil rigidly fixed to a tubular member which is rigidly mounted directly to the member to be vibrated, a magnet assembly disposed concentrically with respect to the motor coil assembly, a resilient suspension supporting the magnet assembly for axial movement relative to the motor coil assembly, and caps closing the axial ends of the tubular member, wherein the caps comprise the resilient suspension.

16. A loudspeaker according to claim 15, wherein each cap comprises an annular compliant roll surround.

17. A loudspeaker according to claim 16, further comprising magnetic shields over the caps.

18. A loudspeaker comprising:

a member having capacity to sustain and propagate input vibrational energy by bending waves in at least one operative area extending transversely of thickness, and an inertial transducer mounted on said member to vibrate the member forming an acoustic radiator which provides an acoustic output, the transducer comprising complementary magnet assemblies and motor coil assemblies mounted on opposite faces of the member and a fastener tying the magnet assemblies together for push-pull operation, wherein each motor coil assembly has a coil rigidly fixed to a tubular member which is rigidly mounted directly to the member to be vibrated, each magnet assembly is disposed concentrically with respect to its respective motor coil assembly, and a resilient suspension supports the magnet assemblies for axial movement relative to the motor coil assemblies.

19. A loudspeaker according to claim 18, wherein the magnet assembly comprises opposed generally disc-like pole pieces, the periphery of one of which is disposed within and adjacent to the motor coil assembly, the periphery of the other of which pole pieces is formed with a flange arranged to lie adjacent to and to surround the motor coil assembly.

20. A loudspeaker according to claim 19, wherein the resilient suspension comprises a resilient member which is sandwiched between one of the pole pieces and a face of the radiator.

* * * * *